United States Patent
Kurian et al.

(10) Patent No.: US 9,681,471 B1
(45) Date of Patent: Jun. 13, 2017

(54) PAIRING OF DEVICES FOR ACTIVATION/DEACTIVATION OF A PAIRED DEVICE

(71) Applicant: BANK OF AMERICA CORPORATION, Charlotte, NC (US)

(72) Inventors: Manu Jacob Kurian, Dallas, TX (US); Greg M. Correro, Oak Point, TX (US); Andrew Benjamin Glassman, Charlotte, NC (US); Anish Z. Abraham, Sunnyvale, TX (US); Andy Lee Anderson, McKinney, TX (US); Glenn Edward Hupfer, Highland Village, TX (US); Murali Sampath, Flower Mound, TX (US); Kirubel Getachew, Garland, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 15/253,662

(22) Filed: Aug. 31, 2016

(51) Int. Cl.
*H04W 76/02* (2009.01)
*H04W 4/00* (2009.01)
*G08C 17/02* (2006.01)

(52) U.S. Cl.
CPC ............ *H04W 76/02* (2013.01); *G08C 17/02* (2013.01); *H04W 4/008* (2013.01)

(58) Field of Classification Search
CPC .......................... H04W 4/008; H04W 76/02
See application file for complete search history.

(56) References Cited

U.S. PATENT DOCUMENTS

| | | |
|---|---|---|
| 7,671,756 B2 | 3/2010 | Herz et al. |
| 7,674,298 B1 | 3/2010 | Cambridge |
| 7,769,394 B1 | 8/2010 | Zhu |
| 7,925,022 B2 | 4/2011 | Jung et al. |
| 8,045,961 B2 | 10/2011 | Ayed et al. |
| 8,396,458 B2 | 3/2013 | Raleigh |
| 2005/0186954 A1 | 8/2005 | Kenney |
| 2006/0117197 A1 | 6/2006 | Nurmi |
| 2007/0155418 A1 | 7/2007 | Shau et al. |
| 2008/0216001 A1 | 9/2008 | Ording et al. |
| 2009/0096573 A1 | 4/2009 | Graessley |
| 2009/0187676 A1 | 7/2009 | Griffin et al. |
| 2011/0034208 A1 | 2/2011 | Gu et al. |
| 2011/0130170 A1 | 6/2011 | Han et al. |
| 2011/0148752 A1 | 6/2011 | Alameh et al. |
| 2011/0169654 A1 | 7/2011 | Ketari |
| 2011/0313922 A1 | 12/2011 | Ben Ayed |
| 2012/0019361 A1 | 1/2012 | Ben Ayed |

(Continued)

*Primary Examiner* — Tuan Pham
(74) *Attorney, Agent, or Firm* — Michael A. Springs; Moore & Van Allen PLLC; James C. Edwards

(57) ABSTRACT

A device/object is paired to one or more communication devices for the purpose of activating and/or deactivating the device/object. Such activation of the device/object requires that the paired devices be in concurrent possession of the user (i.e., within a specified range of the user) and that, while in concurrent possession of the user, communicate information from the device/object to the communication device. Thus, the invention provides for additional security, in that two or more devices must in the possession of the user (or within the specified range of the user), and communicating with one another, in order for one of the paired devices to be in activated state.

16 Claims, 4 Drawing Sheets

(56) References Cited

U.S. PATENT DOCUMENTS

| | | | |
|---|---|---|---|
| 2012/0019379 A1 | 1/2012 | Ben Ayed | |
| 2012/0052793 A1* | 3/2012 | Brisebois | H04W 88/06 455/1 |
| 2013/0139218 A1* | 5/2013 | Roulland | G06F 21/42 726/3 |
| 2014/0066046 A1* | 3/2014 | Keshavdas | H04W 4/20 455/419 |
| 2014/0370807 A1* | 12/2014 | Lei | G06K 9/00496 455/41.2 |
| 2015/0178732 A1* | 6/2015 | Laracey | G06Q 20/1085 705/43 |
| 2016/0147300 A1 | 5/2016 | Liao et al. | |
| 2016/0163177 A1* | 6/2016 | Klicpera | E03B 7/071 137/59 |
| 2016/0197934 A1* | 7/2016 | Muraoka | H04L 63/104 726/7 |

\* cited by examiner

PAIRING OF DEVICES FOR ACTIVATION/DEACTIVATION OF A PAIRED DEVICE

FIELD OF THE INVENTION

The present invention is generally related information security and, more specifically, systems and devices pairing of devices for automated activation and deactivation of a paired device.

BACKGROUND

Individuals have a tendency to lose, misplace or otherwise forget objects, specifically, objects that are normally in their possession. Examples of such objects include, but are not limited to mobile communication devices (i.e., cellular telephones), keys, wallets, payment cards and the like. In addition, these objects are generally viewed as being valuable and, therefore have a tendency to be misappropriated and/or misused by unauthorized users.

The current trend is to configure such personal objects/devices as "smart" devices, in that, the objects/devices include electronics (e.g., smart chip or the like), which provide for the objects/devices to be connected to other objects/devices or networks via different wireless protocols that can operate to some extent interactively and autonomously.

Therefore, a need exists to develop systems, devices and the like that provide for the automated activation and/or deactivation of such smart devices in the event that a smart device is misplaced, lost, or misappropriated.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by pairing of two or more objects for the purpose of automated activation and deactivation of at least one of the paired devices. In specific embodiments of the invention activation is based on the paired devices being in physical possession of a user and communicating of information from the device being activated (or remaining activated) to the other paired device. As such according to embodiments of the invention, in the event that a user does not concurrently possess both of the paired devices, at least one of the paired devices (i.e., the device that the user is not currently in possession of) is deactivated or, is otherwise not in an activated state.

In specific embodiments of the invention the paired devices are configured to be active based on their proximity to one another (i.e., within a predetermined range of one another). In such, embodiments, the paired devices may be configured to communicate via short-range wireless communication, such as, but not limited to, Radio Frequency Identifier (RFID) operating in the 433 MHz or 865-868 MHz frequency band, Near Field Communication (NFC) operating in the 13.56 MHz frequency band, BLUETOOTH® operating in the 2400 and 2483.5 MHz or some derivate form thereof. In such embodiments, at least one of the paired devices remains in an active state as long as the paired devices are within the communicable field of the chosen short-range wireless communication protocol (i.e., capable of receiving short-range wireless communication signals from the paired device). Once the devices are no longer within the range of the short-range wireless communication mechanism, at least one of the paired devices moves from an active state to a deactivated state. In specific embodiments of the invention, the user may be notified, via a text message that the paired device is reaching the outer limits of the range of the short-range communication protocol (i.e., about to be deactivated) and/or is no longer in short-range wireless communication with the paired device (i.e., the device has been deactivated).

In other embodiments of the invention, one of the paired devices includes readable indicia (e.g., 2D barcode or the like) and the other paired device is configured with an image capturing device, such that activation of the paired device with the indicia is accomplished by the other paired device capturing and reading the indicia. In such embodiments of the invention the activation of the paired device may be configured as single use (i.e., one time only use) or for a predetermined period of time upon which the paired device moves back to a deactivated state.

A system for pairing devices for activation of a paired device defines first embodiments of the invention. The system includes a first device and one or more communication devices. The communication devices are in wireless network communication, via the Internet or the like, with an entity that is operable to activate or deactivate the first device. The system additionally includes a pairing module that is stored in a memory and executable by a processor. The pairing module is configured to pair the first device to at least one of the communication devices. In addition, the system includes an activation/deactivation module that is configured to provide for the first device to be in an activated state based on (i) the first device and the at least one communication device being in concurrent possession of a user, and (ii), while in concurrent possession of the user, communicating information from the first device to the at least one communication device.

In specific embodiments of the system, the first device includes at least one short-range wireless communication device and the communication device includes at least one corresponding short-range wireless communication mechanism for reading the short-range wireless communications from the first device or otherwise forming a short-range wireless connection with the first device. In specific related embodiments of the system, the communication device includes one or more of a mobile communication device, a wearable device, a key fob device, a smart wallet or the like. In such embodiments of the system, the pairing module is further configured to pair the first device to the communication device by registering the first device with the communication device.

In further related embodiments of the system, the activation/deactivation module is further configured to provide for the first device to be in an activated state based on the short-range wireless communication mechanism of the communication device receiving a short-range wireless signal from the short-range wireless communication device of the first device. In other related specific embodiments of the system, the activation/deactivation module is further configured to provide for the first device to be in a deactivated state based on the short-range wireless communication mechanism of the communication device being outside of a range for receiving a short-range wireless signal from the short-range wireless communication device of the first device. In such embodiments of the invention, the activation/deactivation module is further configured to provide for the first device to be in a deactivated state by, in response to the on the short-range wireless communication mechanism of the communication device being outside of a range for receiving a short-range wireless signal, communicating a deactivation request to a network entity configured to activated and deactivate the first device.

In still further related embodiments the system includes an alert module that is stored in a memory and executable by the processor and configured to receive a signal that indicates that the first device and the communication device are nearing being outside the range for the communication device to receive the short-range wireless communication from the communication device and, in response to receiving the signal, communicate an alert to a user that indicates that the first device is about to be deactivated. In other related embodiments of the system, the alert module is configured to receive a signal that indicates that the first device and the communication device are outside of the range for the communication device to receive the short-range wireless communication from the communication device and, in response to receiving the signal, communicate an alert to a user that indicates that the first device is in the deactivated state.

In specific embodiments of the system, the first device includes readable indicia, such as coded indicia (e.g., two-dimensional (2D) bar code or the like) and the communication device includes an image capturing device for capturing the readable indicia and a decoding mechanism for decoding the readable indicia. In related specific embodiments of the system, the paring and activation module is stored and executed on the communication device.

In further related embodiments of the system, the activation/deactivation module is further to configured to pair the first device to the communication device by capturing the readable indicia from the first device with the image capturing device of the communication device. In related embodiments of the system, the activation/deactivation module is further to configured to provide for the first device to move from a deactivated state to an activated state in response to the communication device capturing and decoding the readable indicia from the first device. In specific related embodiments of the system, the first device remains in the activated state for a single transaction or, in other embodiments of the system, the first device remains in the activated state for a predetermined period of time.

In still further related embodiments of the system, the activation/deactivation module is further to configured to provide for the first device to move from an activated state to deactivated state in response to the communication device capturing and decoding the readable indicia.

In other related embodiments of the system, the activation/deactivation module is further configured to provide for a user input that moves the first device between an activated state and a deactivated state.

A device for pairing devices for activation of a paired device defines second embodiments of the invention. The device includes a computing platform including a memory and at least one processor in communication with the memory. The device further includes a pairing module that is stored in the memory and executable by one or more of the processors. The module is configured to pair a first device to at least one communication device that is in communication with a network entity operable to activate and deactivate the first device. Paring of the first device to the at least one communication device provides for the first device to be in an activated state based on the first device and the at least one communication device being in concurrent possession of a user and, while in concurrent possession, communicate information, from the first device to the at least one communication device.

A computer program product including a non-transitory computer-readable medium defines third embodiments of the invention. The computer-readable medium includes a first set of codes for causing a computer to pair a first device to at least one communication device that is in communication with a network entity operable to activate and deactivate the first device. The pairing of the first device to the at least one communication device provides for the first device to be in an activated state based on the first device and the at least one communication device being in concurrent possession of a user and, while in concurrent possession of the user, communicating information from the first device to the at least one communication device. The computer-readable medium additionally includes a second set of codes for causing a computer to place the first device in the activated state based on the first device and the at least one communication device being in concurrent possession of the user and, while in concurrent possession, communicating information from the first device to the at least one communication device.

Thus, systems, apparatus, methods, and computer program products herein described in detail below provide for paring of a device/object to one or more communication devices for the purpose of activating and/or deactivating the device/object. Such activation of the device/object requires that the paired devices be in concurrent possession of the user (i.e., within a specified range of the user) and that, while in concurrent possession of the user, communicate information from the device/object to the communication device. Thus, such systems provide for additional security, in that two or more devices must in the possession of the user (or within the specified range of the user), in order for one of the paired devices to be in activated state.

In specific embodiments, the paired device/object and the communication device(s) include short-range wireless communication mechanisms that allow for corresponding communication of short-range wireless communication between device/object and the communication device(s), such that, the device/object is in an activated or deactivated stated based on whether the communication device(s) is able is not able to receive the short-range wireless signals from the device/object. In other specific embodiments of the invention, the paired device/object includes readable indicia, such as 2D barcode or the like that is captured by an image capturing device embodied within the communication device and read/decoded by the communication device. The capturing and reading of the indicia by the paired device results in the device/object being moved from the deactivated state to the activated state (or vice versa).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
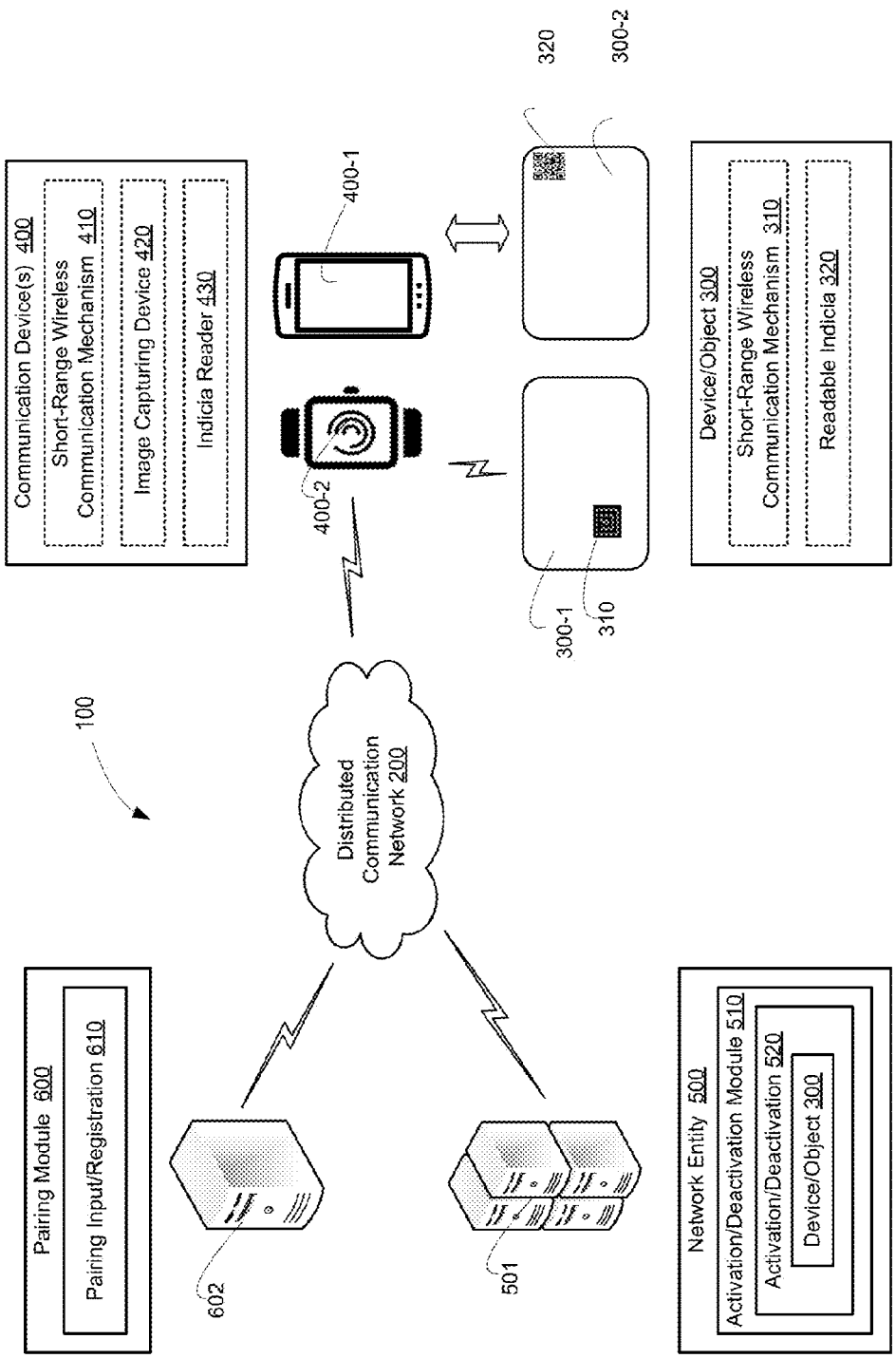
Figure 2:
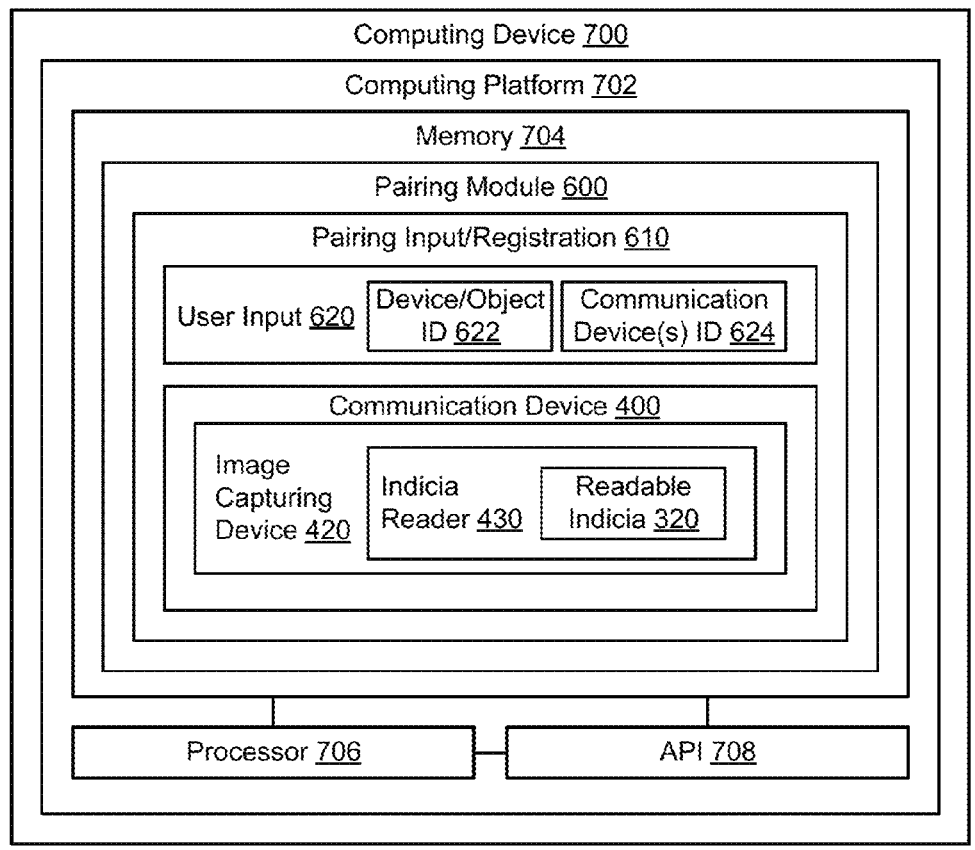
Figure 3:
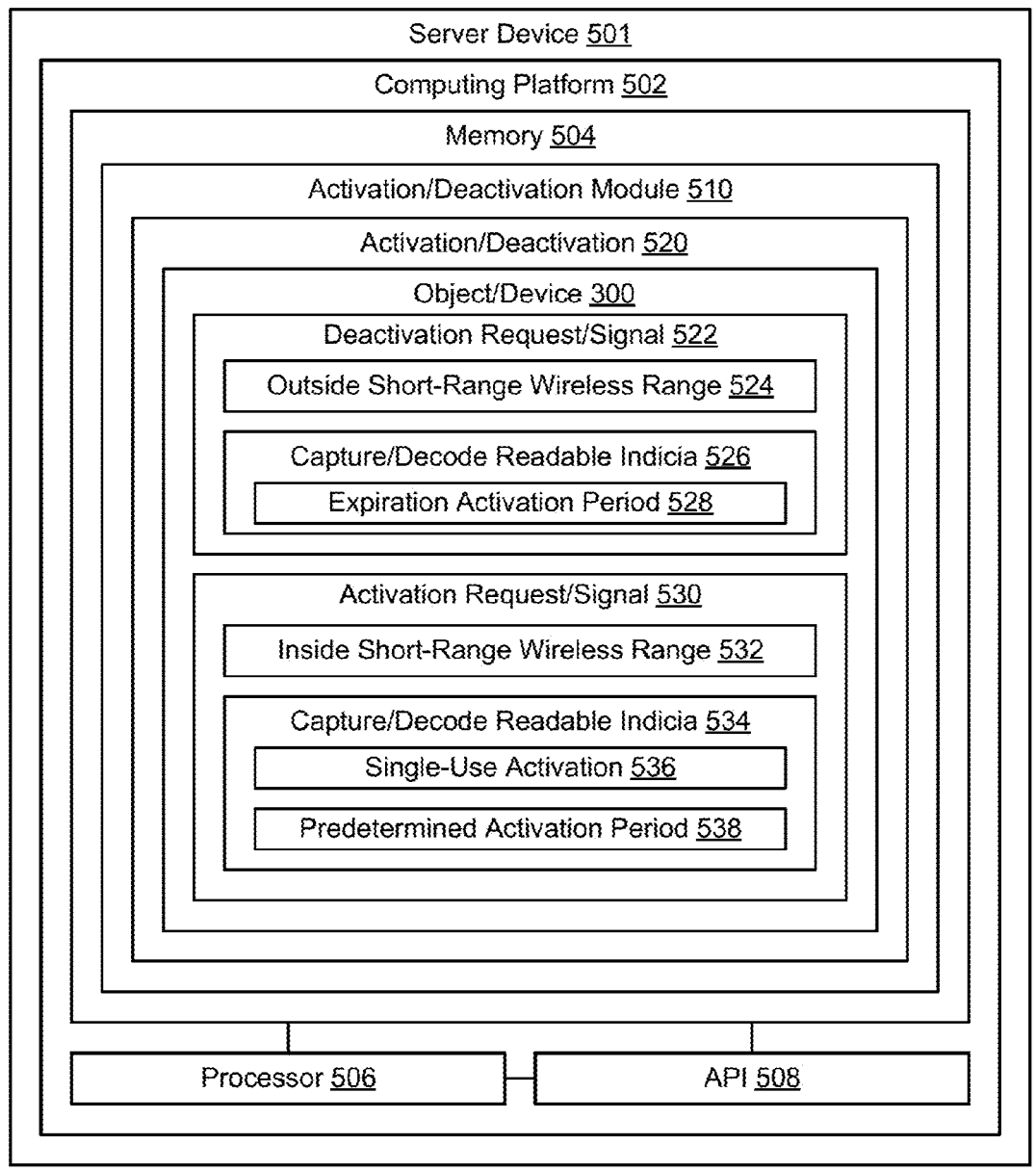
Figure 4:
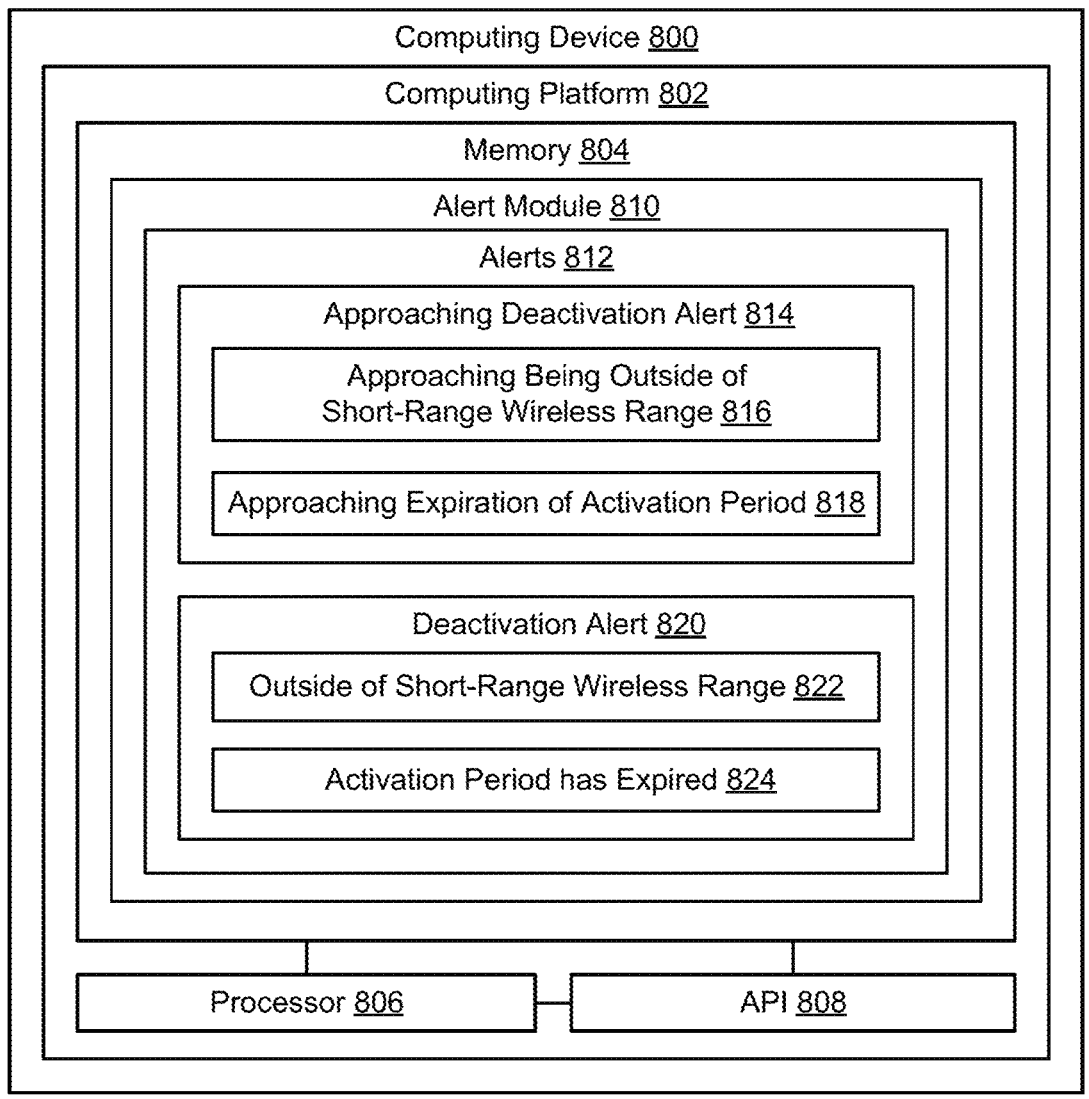

Having thus described embodiments of the invention in general terms, reference will now be made the accompanying drawings, wherein:

FIG. 1 provides a block diagram of a system for pairing devices for purpose of activation and deactivation, in accordance with embodiments of the present invention;

FIG. 2 provides a block diagram of a computing device including a pairing module, in accordance with embodiments of the present invention;

FIG. 3 provides a block diagram of a network entity/server including an activation/deactivation module, in accordance with embodiments of the present invention; and FIG. 4 provides a block diagram of a computing device including an alert module for alert users of activation and/or deactivation of a paired device, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal allocation. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Thus, embodiments of the present invention address the above needs and/or achieve other advantages by pairing of two or more objects for the purpose of automated activation and deactivation of at least one of the paired devices. In specific embodiments of the invention activation is based on the paired devices being in concurrent possession of a user (or within a defined physical range of the user). In addition, activation of is based on communicating information from the device being activated (or remaining activated) to the other paired device while in the concurrent possession of the user. As such, according to embodiments of the invention, in the event that a user does not concurrently possess both of the paired devices (e.g., a device is lost, misplace, misappropriated or the like), at least one of the paired devices (i.e., the device that the user is not currently in possession of) is deactivated or, is otherwise not in an activated state.

In specific embodiments of the invention the paired devices are configured to be active based on their proximity to one another (i.e., within a predetermined range of one another). In such, embodiments, the paired devices may be configured to communicate via short-range wireless communication, such as, but not limited to, Radio Frequency Identifier (RFID) operating in the 433 MHz or 865-868 MHz frequency band, Near Field Communication (NFC) operating in the 13.56 MHz frequency band, BLUETOOTH® operating in the 2400 and 2483.5 MHz or some derivate form thereof. In such embodiments, at least one of the paired devices remains in an active state as long as the paired devices are within the communicable field of the chosen short-range wireless communication protocol (i.e., capable of receiving short-range wireless communication signals from the paired device). Once the devices are no longer within the range of the short-range wireless communication mechanism, at least one of the paired devices moves from an active state to a deactivated state. In specific embodiments of the invention, the user may be notified, via a text message that the paired device is reaching the outer limits of the range of the short-range communication protocol (i.e., about to be deactivated) and/or is no longer in short-range wireless communication with the paired device (i.e., the device has been deactivated).

In other embodiments of the invention, one of the paired devices includes readable indicia (e.g., 2D barcode or the like) and the other paired device is configured with an image capturing device, such that activation of the paired device with the indicia is accomplished by the other paired device capturing and reading the indicia. In such embodiments of the invention the activation of the paired device may be configured as single use (i.e., one time only use) or for a predetermined period of time upon which the paired device moves back to a deactivated state.

Referring to FIG. 1, a block diagram is shown of a system 100 for pairing devices for the purpose of activation and deactivation, in accordance with embodiments of the present invention. The system 100 comprises a device/object 300 that requires activation and/or deactivation and at least one communication device 400 that is paired with the device/object 300 for the purpose of activating and deactivating the device/object 300.

According to embodiments of the system, the device/object 300 is any portable and/or personal object/device that can be activated and/or deactivated and, typically, an object/device that has security requirements to prevent unauthorized use of the object/device by others. According to embodiments of the invention, the device/object is configured to communicate information to the communication device 400. In specific embodiments of the system, the device/object 300 includes a card-like device/object 300-1 and 300-2, such as a smart card, which may comprise a payment card, an entry/key card or the like.

According further specific embodiments of the system, the device/object 300 is configured to communicate information to the communication device 400 using a short-range wireless interface/mechanism 310 that is configured to generate a short-range wireless communication and/or connection. The short-range wireless communication mechanism 310 may include any known or future known short-range wireless communication mechanism 310 that is capable of remaining in short-range wireless communication with another device (e.g., communication device 400 that is in the possession of a user. For the purpose of the present invention, the phrase "in the possession of the user" may include actual possession by the user as well as within a physical range of the user, as defined by the signaling/reception range of the short-range wireless communication mechanism 310. As previously discussed the short-range wireless communication may include, but is not limited to, NFC, RFID, BLUETOOTH®, ZIGBEE®, WI-FI® or the like.

In other specific embodiments of the system, the device/object 300 is configured to communicate information to the communication device 400 via image capturing of readable indicia 320 disposed on a surface of the device/object 300. The readable indicia 320 may include coded indicia, such as a two-dimensional (2D) barcode or the like. The 2D barcode may take the form of a Quick Response (QR) code, Aztec Code, Data Matrix code or the like. The readable indicia, at a minimum, includes information that identifies the device/object (e.g., specific identifier associated with the device/object 300).

Additionally, system 100 includes one or more communication devices 400 that are paired with the object/device 300 for the purpose of activation/deactivation of the object/device 300. The communication device 400 is configured to communicate, either wirelessly or wired, over distributed communication network 200, which may include the public networks, such as the Internet and/or private networks, such as private intranets or the like. The communication devices 400 may include any mobile communication device that would typically be in the possession of the user while concurrently possessing the object/device 300. Examples of such mobile communication devices include, but are not limited to, smart telephone 400-1, wearable computing device/watch 400-2, a key fob (not shown in FIG. 1), a wallet embedded with a smart chip (not shown in FIG. 1) or the like. In other embodiments of the invention, the communication device 400 may include conventionally non-mobile communication devices, such as personal computers or the like.

In specific embodiments of the invention, the communication device 400 includes a short-range wireless communication mechanism 410 that corresponds in communication protocol with the short-range wireless communication mechanism 310 included in the device/object 300. As such, short-range wireless communication mechanism 410 is configured to receive short-range wireless communication signals from short-range wireless communication mechanism 310 and/or form a short-range wireless communication connection with short-range wireless communication mechanism 310.

In other specific embodiments of the invention, the communication device 400 includes an image capturing device 420, such as a digital camera, digital video recorder or the like, and indicia reader 430 capable of reading and/or decoding indicia captured by the image capturing device 420.

Additionally, the system includes pairing module 600 which may be executed at a network server 602, as shown in FIG. 1, or may be executed as an application on the communication device 400. In specific embodiments of the invention, a user accesses the pairing module 600 to provide the request pairing input/registration 610. In specific embodiments of the invention, the pairing module 600 may be implemented as part of an online portal and/or mobile application associated with an entity in control or otherwise authorizing use of the device/object 300. According to specific embodiments of the system, a user may access the pairing module 600 to register the device/object 300 and at least one communication device 400. In specific embodiments of the system, the pairing module 600 may be configured to allow for the pairing of the device/object 300 to more than one communication device 400 for the purpose of activation and/or deactivation of the device/object 300. For example, in certain embodiments of the invention the device/object and the two or more paired communication devices are required to be the possession of the user (e.g., in the range of wireless communication between the device/object 300 and the two or more paired communication devices 400). Registering the device/object 300 and the one or more communication devices 400 may provide for inputting requisite information that identifies the device/object 300 and computing device(s) 400. Such identification may include, but is not limited to, identifiers associated with the device/object 300 and computing device(s) 400 themselves and/or identifies associated with the short-range wireless communication mechanisms 310/410, such as addresses and the like. Additionally, registration may include providing any security credentials (e.g., passwords) and the like required to initiate and/or receive short-range wireless communication between the device/object 310 and the communication device(s) 400.

In other embodiments of the system, in which the pairing module 600 is executed on the communication device 400, pairing of the device/object 300 to the communication device 400 may comprise capturing the readable indicia 320 on the device/object 300 by the image capturing device 420 of the communication device 400. In such embodiments of the system, the capturing and decoding of the readable indicia, which identifies the device/object 300 for the purpose of pairing, may serve to obviate the need for any other user input (or be implemented in conjunction with an additional user input).

In addition to paring the device/object 300 to the communication device 400 for the purpose of activation and deactivation of the device/object 300, in other embodiments of the invention, the paring the device/object 300 to the communication device 400 may be used for the purpose of authentication. For example, the paring (e.g., short-range wireless communication prevalent, capturing of the readable indicia) may be required, in addition to or in lieu of presentation of user credentials (e.g., password/code, biometrics or the like) to use the device/object 300 and/or gain access to an associated online portal and/or mobile application.

The system additionally includes network entity 500, which may comprise server(s) 501 that is in network communication with the communication device 400 via distributed communication network 200. Network entity 500 includes activation/deactivation module 510 that is configured to control activation/deactivation 520 of the device/object 300 based on communications received from the communication device 400. For example, in specific embodiments of the system, the communication device may transmit a deactivation request/signal in response to being outside the range of the short-range wireless communication of the device/object 300 (i.e., the short-range wireless communication connection is dropped or the communication device no longer receives a signal from the device/object 300) and the activation/deactivation module 510 responds by deactivating the device/object 300. Deactivation as used herein means that the device/object is not operable for at least one, and in some embodiments all, of the intended uses. In other specific embodiments in which the device/object 300 is currently deactivated, the communication device 400 may transmit an activation request/signal in response being inside the range of the short-range wireless communication of the device/object 300 (i.e., the short-range wireless communication connection is reconnected/active or the communication device is receiving a signal from the device/object 300) and the activation/deactivation module 510 responds by activating the device/object 300.

In other embodiments of the system, in response to capturing/decoding the readable indicia 320 disposed on the device/object 300, the communication device 400 may transmit either a deactivation or an activation communication/signal depending on which state the device/object is currently in and/or the configuration of the system and/or the configuration of the user (i.e., the system or the user may configure activation or deactivation based on capturing the readable indicia 320 from the device/object 300).

In additional embodiments of the system, the activation/deactivation module may be accessible to a user, via an online portal, mobile application or the like, such that the user may provide an input to change the state of the device/object 300 (i.e., move/change the device/object 300 from the activated state to the deactivated state or vice versa).

Referring to FIG. 2 a block diagram is presented of the computing device 700 configured for paring devices, in accordance with embodiments of the invention. As previous discussed computing device 700 may comprise a server device, such as server 602 of FIG. 1 or the computing device may comprise one of the one or more communication devices 400. In this regard the paring module 600 may be executed via an online or mobile application or may be executed directly on the communication device(s) 400. The communication device 700 includes a computing platform 702 that can execute algorithms, such as modules, routines, applications and the like. Computing platform 702 includes memory 204, which may comprise volatile and non-volatile memory, such as read-only and/or random-access memory (RAM and ROM), EPROM, EEPROM, flash cards, or any memory common to computer platforms). Moreover, memory 204 may comprise cloud storage, such as provided by a cloud storage service and/or a cloud connection service.

Further, computing platform 702 also includes processor 706, which may be an application-specific integrated circuit ("ASIC"), or other chipset, logic circuit, or other data processing device. Processor 706 may execute an application programming interface ("API") 708 that interfaces with any resident programs, such as pairing module 600 and sub-routines associated therewith or the like stored in the memory 704 of the computing device 700.

Processor 706 may include various processing subsystems (not shown in FIG. 2) embodied in hardware, firmware, software, and combinations thereof, that enable the functionality of computing device 700 and the operability of the communication device 700 on a network. For example, processing subsystems allow for initiating and maintaining communications and exchanging data with other networked devices. For the disclosed aspects, processing subsystems of processor 706 may include any subsystem used in conjunction with pairing module 600 and related sub-routines, algorithms, sub-algorithms, modules, sub-modules thereof.

Computer platform 702 may additionally include a communications module (not shown in FIG. 2) embodied in hardware, firmware, software, and combinations thereof, that enables electronic communications between the computing device 700 and communication device 400 (in those embodiments in which the devices are distinct) and network entity 500/server 501 (shown in FIG. 1). Thus, communication module may include the requisite hardware, firmware, software and/or combinations thereof for establishing and maintaining a network communication connection.

Memory 704 of communication device 200 stores pairing module 600 that is configured to pair at least one communication device 400 (shown in FIG. 1) with device/object (300 (shown in FIG. 1). As previously discussed, in specific embodiments of the invention, a user accesses the pairing module 600 to provide the request pairing input/registration 610. In specific embodiments of the invention, the pairing module 600 may be implemented as part of an online portal and/or mobile application associated with an entity in control or otherwise authorizing use of the device/object 300. According to specific embodiments of the invention, a user may access the pairing module 600 to register the device/object 300 and at least one communication device 400 Registering the device/object 300 and the one or more communication devices 400 may provide for a user input 620 of requisite information including a device/object identifier 622 and a computing device(s) identifier 624. Such identification may include, but is not limited to, identifiers associated with the device/object 300 and computing device(s) 400 themselves and/or identifies associated with the short-range wireless communication mechanisms 310/410, such as addresses, protocols and the like. Additionally, the user inputs 314 any security credentials (e.g., passwords) and the like required to initiate and/or receive short-range wireless communication between the device/object 310 and the communication device(s) 400.

In other embodiments of the invention, in which the pairing module 600 is executed on the communication device 400, pairing of the device/object 300 to the communication device 400 may comprise capturing the readable indicia 320 located on the device/object 300 by the image capturing device 420 of the communication device 400 and reading/decoding the readable indicia 320 via the indicia reader 430. In such embodiments of the system, the capturing and reading/decoding of the readable indicia 320, which identifies the device/object 300 for the purpose of pairing, may serve to obviate the need for any other user input (or be implemented in conjunction with an additional user input). In other words, the capturing and reading/decoding of the readable indicia 320 by the device to which it is being paired with (i.e., the communication device 400) serves to automatically pair the device/object 300 to the communication device 400.

Referring to FIG. 3 a block diagram is presented of the server device 501, in accordance with additional embodiments of the invention. In addition to providing more detail, FIG. 3 provides various optional embodiments of the activation/deactivation module 510. The server device 501 includes a computing platform 502 that can execute algorithms, such as modules, routines, applications and the like. Computing platform 502 includes memory 504, which may comprise volatile and non-volatile memory, such as read-only and/or random-access memory (RAM and ROM), EPROM, EEPROM, flash cards, or any memory common to computer platforms). Moreover, memory 504 may comprise cloud storage, such as provided by a cloud storage service and/or a cloud connection service.

Further, computing platform 502 also includes processor 506, which may be an application-specific integrated circuit ("ASIC"), or other chipset, logic circuit, or other data processing device. Processor 506 may execute an application programming interface ("API") 508 that interfaces with any resident programs, such as activation/deactivation module 510 and sub-routines associated therewith or the like stored in the memory 504 of the server device 501.

Processor 506 may include various processing subsystems (not shown in FIG. 3) embodied in hardware, firmware, software, and combinations thereof, that enable the functionality of server device 501 and the operability of the device 501 on a network 200. For example, processing subsystems allow for initiating and maintaining communications and exchanging data with other networked devices. For the disclosed aspects, processing subsystems of processor 506 may include any subsystem used in conjunction with activation/deactivation module and related sub-routines, algorithms, sub-algorithms, modules, sub-modules thereof.

Computer platform 502 may additionally include a communications module (not shown in FIG. 3) embodied in hardware, firmware, software, and combinations thereof, that enables electronic communications between the server device 501 and the communication device(s) 400 (shown in FIG. 1). Thus, communication module may include the requisite hardware, firmware, software and/or combinations thereof for establishing and maintaining a network communication connection.

Memory 504 of mobile communication device 300 stores activation/deactivation module 510 that is configured to activation/deactivation module 510 that is configured to control activation/deactivation 520 of the device/object 300 based on communications received from the communication device 400. For example, in specific embodiments of the system, the communication device may transmit a deactivation request/signal 522 in response to being outside the range 524 of the short-range wireless communication of the device/object 300 (i.e., the short-range wireless communication connection is dropped or the communication device no longer receives a signal from the device/object 300) and the activation/deactivation module 510 responds by deactivating the device/object 300. In other embodiments of the invention, in response to capturing/decoding 526 the readable indicia 430, the communication device 400 may transmit a deactivation request/signal 522 based on the expiration of the predetermined activation period 528.

In other specific embodiments in which the device/object 300 is currently deactivated, the communication device 400 may transmit an activation request/signal 530 in response to the device/object 300 and communication device 400 being inside the range 532 of the short-range wireless communication (i.e., the short-range wireless communication connection is reconnected/active or the communication device is receiving a signal from the device/object 300) and the activation/deactivation module 510 responds by activating the device/object 300. In other embodiments of the invention, the communication device 400 may transmit the activation request/signal 530 in response to the communication device 400 capturing and reading the readable indicia 430. In such embodiments of the invention, the device/object 300 may be activated for a single-use 536 (e.g., single transaction, single entry or the like) or the device object 300 may be activated for a predetermined activation period 536 or, in alternate embodiments the device/object 300 may be activated indefinitely (e.g., until deactivated either by user input or un-pairing of the devices (e.g., devices outside range of short-range wireless communication or further capturing/decoding of the readable indicia).

In other embodiments of the system, in response to capturing/decoding the readable indicia 320 disposed on the device/object 300, the communication device 400 may transmit either a deactivation or an activation communication/signal depending on which state the device/object is currently in and/or the configuration of the system and/or the configuration of the user (i.e., the system or the user may configure activation or deactivation based on capturing the readable indicia 320 from the device/object 300).

In additional embodiments of the system, the activation/deactivation module may be accessible to a user, via an online portal, mobile application or the like, such that the user may provide an input to change the state of the device/object 300 (i.e., move/change the device/object 300 from the activated state to the deactivated state or vice versa).

Referring to FIG. 4 a block diagram is depicted of a computing device 800 configured to include an alert module 804, in accordance with embodiments of the present invention. The computing device 800 may the same device as server device 501 or another computing device in communication with the distributed communication network 200. In this regard, alert module 804 may be a separate module or may be included as sub-module of the activation/deactivation module 510. Similar to the computing device 700 shown in FIG. 2, the computing device 800 includes a computing platform 802 having a memory 804 and a processor 806 and application programming interface 808 in communication with the memory 804.

The memory 804 of computing device 800 stores alert module 810 that is configured to generate and initiate communication of alerts 812 to the users. The alerts 812 are configured to notify the user of impending or actual deactivation or activation of the device/object 300. Alerts may be configured to be generated and communicated by the system provider (e.g., device/object provider) and/or by the user.

In specific embodiments of the invention, the alert 812 is an approaching deactivation alert 814 that notifies the user that the device/object 300 is approaching de activation. In specific embodiments of the invention, the alert 814 is generated based on signaling/communication that indicates that the device/object 300 and the paired communication device(s) 400 are approaching being outside of the range 816 of the short-range wireless communication (e.g., the short-range wireless communication signal has degraded to a predetermined level or the like). In other specific embodiments of the invention, the alert 814 is generated based on the activation period approaching expiration 818. For example, in those embodiments of the invention, in which capturing the readable indicia 320 triggers activation of the device/object 300 for a predetermined period of time, the alert 814 may be generated based on the predetermined period of time being close to expiring.

In other embodiments of the invention, the alert 812 is a deactivation alert 820 that notifies the user that the device/object 300 has been deactivated. The deactivation alert 820 may be generated based on signaling/communication that indicates that the device/object 300 and the paired communication device(s) 400 are outside of the range 822 of the short-range wireless communication (e.g., the short-range wireless communication connection has been lost or the communication device is no longer receiving short-range wireless communication signals from the device/object or the like). In other specific embodiments of the invention, the alert 820 is generated based on the expiration of the activation 824. For example, in those embodiments of the invention, in which capturing the readable indicia 320 triggers activation of the device/object 300 for a predetermined period of time, the alert 820 may be generated based on expiration of the predetermined period of time. In other specific embodiments of the invention, the deactivation alert 820 may be configured to allow the user/recipient to provide an input (e.g., activate a link or the like) to re-activate the object/device 300.

In other embodiments of the invention, the alert module 810 may be configured, by the system provider and/or the user, to generate and initiate communication of other alerts associated with the activation/deactivation module 510. For example, alerts may be generated and communication initiated based on the device/object 300 moving from a deactivated state to an activated state.

Thus, systems, apparatus, methods, and computer program products described above provide for paring of a device/object to one or more communication devices for the purpose of activating and/or deactivating the device/object. Such activation of the device/object requires that the paired devices be in concurrent possession of the user (i.e., within a specified range of the user) and that, while in concurrent possession of the user, communicate information from the device/object to the communication device. Thus, such systems provide for additional security, in that two or more devices must in the possession of the user (or within the specified range of the user), in order for one of the paired devices to be in an activated state.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for pairing devices for activation of a paired device, the system comprising:
a first device including a short-range wireless communication device;
one or more communication devices including a short-range wireless communication mechanism corresponding in type to the short-range wireless communication device and configured to wirelessly communicate with a network entity operable to activate and deactivate the first device;
a pairing module stored in a first memory of a first network server, executable by a first processor and configured to pair the first device to at least one of the communication devices;
an activation/deactivation module stored in a second memory of a second network server and executable by a second processor and configured to provide for the first device to be in an activated state based on the short-range wireless communication mechanism of the communication device receiving a short-range wireless signal from the short-range wireless communication device of the first device and be in a deactivated state based on the short-range wireless communication mechanism of the communication device being outside of a range for receiving a short-range wireless signal from the short-range wireless communication device of the first device and, while in the activated state, communicating information from the first device to the at least one communication device; and
an alert module, stored in a third memory, executable by a third processor and configured to receive a signal from the second network server that indicates that the first device and one of the communication devices are approaching being outside the range for the communication device to receive the short-range wireless communication from the first device and, in response to receiving the signal, communicate an alert to a user of the first device that indicates that the first device is about to be deactivated.

2. The system of claim 1, wherein the pairing module is further configured to pair the first device to the communication device by registering the first device with the communication device.

3. The system of claim 1, wherein the activation/deactivation module is further configured to provide for the first device to be in the deactivated state by, in response to the short-range wireless communication mechanism of the communication device being outside of the range for receiving the short-wireless signal, communicating a deactivation request from the communication device to the activation/deactivation module.

4. The system of claim 1, is further configured to receive a second signal that indicates that the first device and the communication device are outside of the range for the communication device to receive the short-range wireless communication from the first device and, in response to receiving the signal, communicate a second alert to a user of the first device that indicates that the first device is in the deactivated state.

5. The system of claim 1, wherein the communication device further comprises a mobile communication device comprising one of a mobile communication device, a wearable device, a key fob device or a smart wallet.

6. The system of claim 1, wherein the first device includes readable indicia and wherein the communication device includes an image capturing device for capturing the readable indicia and a decoding mechanism for decoding the readable indicia.

7. The system of claim 6, wherein the paring module is stored and executed on the communication device.

8. The system of claim 6, wherein the paring module is further to configured to pair the first device to the communication device by capturing the readable indicia from the first device with the image capturing device of the communication device.

9. The system of claim 6, wherein the activation/deactivation module is further configured to provide for the first device to move from a deactivated state to an activated state in response to the communication device capturing and decoding the readable indicia from the first device.

10. The system of claim 9, wherein the activation/deactivation module is further configured to provide for the first device to move from the deactivated state to the activated state in response to the communication device capturing and decoding the readable indicia from the first device, wherein the first device remains in the activated state for a single transaction.

11. The system of claim 9, wherein the activation/deactivation module is further configured to provide for the first device to move from the deactivated state to the activated state in response to the communication device capturing and decoding the readable indicia from the first device, wherein the first device remains in the activated state for a predetermined period of time.

12. The system of claim 6, wherein the activation/deactivation module is further configured to provide for the first device to move from an activated state to deactivated state in response to the communication device capturing and decoding the readable indicia.

13. The system of claim 1, wherein the activation/deactivation module is further configured to provide for a user input that moves the first device between an activated state and a deactivated state.

14. The system of claim 1, wherein the first device is further defined as a payment card.

15. An apparatus for pairing devices for activation of a paired device, the device comprising:
a computing platform including a memory and at least one processor in communication with the memory;
a pairing module stored in the memory of a first network server, executable by one or more of the processors and configured to pair a first device that includes a short-range wireless communication device to at least one communication device that includes a short-range wireless communication mechanism corresponding in type to the short-range wireless communication and is in communication with a second network server operable to activate and deactivate the first device, wherein paring of the first device to the at least one communication device provides for the first device to be in an activated state based on the short-range wireless communication mechanism of the communication device receiving a short-range wireless signal from the short-range wireless communication device of the first device and be in a deactivated state based on the short-range wireless communication mechanism of the communication device being outside of a range for receiving a short-range wireless signal from the short-range wireless communication device of the first device and, while in the activated state, communicating information, from the first device to the at least one communication device; and
an alert module, stored in a second memory, executable by a second processor and configured to receive a signal from the second network server that indicates that the first device and one of the communication devices are approaching being outside the range for the communication device to receive the short-range wireless communication from the first device and, in response to receiving the signal, communicate an alert to a user of the first device that indicates that the first device is about to be deactivated.

16. A computer program product comprising:
a non-transitory computer-readable medium comprising:
a first set of codes for causing a first computing processor of a first network server to pair a first device that includes a short-range wireless communication device to a at least one communication device that includes a short-range wireless communication mechanism corresponding in type to the short-range wireless communication and is in communication with a network entity operable to activate and deactivate the first device;
a second set of codes for causing a second computing processor of a second network server to place the first device in the activated state based on the short-range wireless communication mechanism of the communication device receiving a short-range wireless signal from the short-range wireless communication device of the first device and place the first device in a deactivated state based on the short-range wireless communication mechanism of the communication device being outside of a range for receiving a short-range wireless signal from the short-range wireless communication device of the first device and, while in the activated state, communicating information from the first device to the at least one communication device; and
a third set of codes for causing a computing processor to receive a signal from the second network server that indicates that the first device and one of the communication devices are approaching being outside the range for the communication device to receive the short-range wireless communication from the first device and, in response to receiving the signal, communicate an alert to a user of the first device that indicates that the first device is about to be deactivated.

* * * * *